United States Patent
Garcia et al.

(10) Patent No.: US 10,409,616 B2
(45) Date of Patent: Sep. 10, 2019

(54) SYSTEMS AND METHODS FOR REDUCING RESERVOIR SIMULATOR MODEL RUN TIME

(75) Inventors: Alejandro Garcia, Goodwood Park (TT); Jordani Rebeschini, Parana (BR); Sergio Henrique Guerra de Sousa, Rio de Janeiro (BR); Gerardo Mijares, Houston, TX (US); Jose Antonio Rodriguez, Katy, TX (US); Luigi Alfonso Saputelli, Houston, TX (US); William Douglas Johnson, Austin, TX (US)

(73) Assignee: Landmark Graphics Corporation, Houston, TX (US)

( * ) Notice: Subject to any disclaimer, the term of this patent is extended or adjusted under 35 U.S.C. 154(b) by 816 days.

(21) Appl. No.: 13/990,753

(22) PCT Filed: Nov. 30, 2010

(86) PCT No.: PCT/US2010/058441
§ 371 (c)(1),
(2), (4) Date: Aug. 19, 2013

(87) PCT Pub. No.: WO2012/074516
PCT Pub. Date: Jun. 7, 2012

(65) Prior Publication Data
US 2013/0338985 A1    Dec. 19, 2013

(51) Int. Cl.
*E21B 49/00* (2006.01)
*G06F 9/44* (2018.01)
*E21B 41/00* (2006.01)

(52) U.S. Cl.
CPC .............. *G06F 9/44* (2013.01); *E21B 49/00* (2013.01); *E21B 2041/0028* (2013.01)

(58) Field of Classification Search
None
See application file for complete search history.

(56) References Cited

U.S. PATENT DOCUMENTS

| | | |
|---|---|---|
| 2005/0149307 A1 | 7/2005 | Gurpinar et al. |
| 2007/0016389 A1* | 1/2007 | Ozgen ............ E21B 49/00 703/10 |
| 2007/0179766 A1* | 8/2007 | Cullick ........... E21B 43/00 703/10 |
| 2007/0179768 A1 | 8/2007 | Culluck et al. |
| 2007/0265815 A1 | 11/2007 | Couet et al. |
| 2008/0162100 A1 | 7/2008 | Landa |
| 2010/0081184 A1* | 4/2010 | Downey .......... E21B 43/006 435/167 |
| 2010/0088076 A1 | 4/2010 | Koutsabeloulis |

OTHER PUBLICATIONS

Reis, Risk Analysis With History Matching Using Experimental Design or Artificial Neural Networks, 2006, Society of Petroleum Engineers, pp. 1-10.*

(Continued)

*Primary Examiner* — Omar F Fernandez Rivas
*Assistant Examiner* — Bernard E Cothran
(74) *Attorney, Agent, or Firm* — Kilpatrick Townsend and Stockton LLP

(57) ABSTRACT

Systems and methods for reducing run time for a reservoir simulator model using a proxy model based on a neural network.

17 Claims, 3 Drawing Sheets

(56) References Cited

OTHER PUBLICATIONS

Techopedia, Definition—What does Artificial Neural Network (ANN) mean?, 2017, Techopedia, pp. 1-3.*
Semantic Scholar, Stochastic Algorithms, 2018, Semantic Scholar, pp. 1-13 (Year: 2018).*
Young, Lee W., International Search Report and Written Opinion, International Searching Authority, PCT/US2010/058441, dated Feb. 9, 2011, Alexandria, Virginia, U.S.A.
Shah, Kamini, International Preliminary Report on Patentability, International Searching Authority, PCT/US2010/058441, dated Jan. 11, 2013, Alexandria, Virginia, U.S.A.
Patent Examination Report No. 1; Australian Patent Application No. 2010364957; dated Jan. 30, 2015; 4 pgs.; Australian Patent Office.
SPE 117762; Optimized Design of Cyclic Pressure Pulsing in a Depleted, Naturally Fractured Reservoir; E. Artun, T. Ertekin, R. Watson and B. Miller, Miller Energy Technologies, Pennsylvania, USA, Oct. 11-15, 2008; 21 pgs.
SPE 62941; Conditioning Reservoir Models to Dynamic Data—A Forward Modeling Perspective: Sanjay Srinivasan, SPE, University of Calgary, Jef Caers, SPE, Stanford University, Dallas, Texas, Oct. 1-4, 2000;16 pgs.
SPE 100133; Application of Artificial Intelligence in Gas Storage Management, G. Zangl, M. Giovannoli, and M. Stundner, SPE, Schlumberger. Vienna, Austria, Jun. 2006; 6 pgs.
SPE 122148 "An Application of Feed Forward Neural Network as Nonlinear Proxies for the Use During the History Matching Phase." T.P. Sampaio, V.J.M. Ferreira Filho. A. de Sa Neto, SPE, Universidade Federal do Rio de Janeiro. Cartagena, Colombia, May 31-Jun. 3, 2009; 11 pgs.
SPE 94357 Treating Uncertainties in Reservoir Performance Prediction with Neural Networks. J.P Lechner, SPE, OMV AG, and G. Zangl, SPE, Schlumberger Information Solutions. Madrid, Spain. Jun. 13-16, 2005; 8 pgs.
Notification; Eurasian Patent Application No. 201390784/31; dated Dec. 11, 2014; 2 pgs.; The Eurasian Patent Office.
Response to Patent Examination Report No. 1; Australian Patent Application No. 2010364957; dated Mar. 24, 2015; 14 pgs.; Callinans.
Examiner's Requisition; Canadian Patent Application No. 2819334; dated Feb. 5, 2015; 3 pgs.; Canadian Patent Office.
Response to the Examinees Requisition; Canadian Patent Application No. 2819334; dated Jul. 28, 2015; 17 pgs.; Canadian Patent Office.
The First Office Action; Chinese Patent Application No. 201080070418. X; dated May 6, 2015; 8 pgs.; Chinese Patent Office.
Office Action; Mexican Patent Application No. MX/a/2013/006155; dated Jul. 29, 2015; 1 pg.; Mexican Patent Office.
Response to the First Office Action; Chinese Patent Application No. 201080070418.X; dated Sep. 21, 2015; 12 pgs.; Lung Tin Intellectual Property Agent Ltd.
The Second Office Action; Chinese Patent Application No. 201080070418.X; dated Jan. 13, 2016; 10 pgs.; Chinese Patent Office.
Bernhard Hustedt; Extended Search Report; dated May 18, 2016; 7 pages; Patent Application No. 10860155.0-1605/2646927; European Patent Office; The Hague.
Canadian Patent Application No. 2,819,334, "Office Action", dated Aug. 8, 2016, 5 pages.
Canadian Patent Application No. 2,819,334, "Office Action", dated Jun. 30, 2017, 5 pages.
Canadian Application No. CA2,819,334 , "Office Action",dated Sep. 10, 2018, 6 pages.
European Application No. EP10860155.0 , "Office Action", dated Jan. 29, 2019, 7 pages.

* cited by examiner

SYSTEMS AND METHODS FOR REDUCING RESERVOIR SIMULATOR MODEL RUN TIME

CROSS-REFERENCE TO RELATED APPLICATIONS

The priority of PCT Patent Application No. PCT/US2010/058441, filed on Nov. 30, 2010, is hereby claimed, and the specification thereof is incorporated herein by reference.

STATEMENT REGARDING FEDERALLY SPONSORED RESEARCH

Not applicable.

FIELD OF THE INVENTION

The present invention relates to systems and methods for reducing run time for a reservoir simulator model. More particularly, the present invention relates to reducing run time for a reservoir simulator model using a proxy model based on a neural network.

BACKGROUND OF THE INVENTION

A full physics numerical model, also referred to as a reservoir simulator model is often used in the oil and gas industry to manage the reservoir and optimize production by determining numerous variables for the reservoir such as, for example, how many wells to drill, where to drill the wells, how to optimally manage water or gas injection, what facilities are needed and when they need to be operational, etc. A reservoir simulator model may also be used to manage the reservoir on a day-to-day or month-to-month basis to optimize production. The reservoir simulator model is intended to predict future production performance for the reservoir—meaning any numeric output common to numerical reservoir simulator models including production profiles, field and region pressures, bottom hole and top pressures and the like. Conventional reservoir simulator models, however, are slow to execute. This problem associated with conventional reservoir simulator models is compounded because the models include hundred to millions of individual equations that must be executed simultaneously in order to execute the full model, which could take hours to days to complete.

SUMMARY OF THE INVENTION

The present invention therefore, meets the above needs and overcomes one or more deficiencies in the prior art by providing systems and methods for generating a fast executing empirical proxy model of a reservoir simulator model.

SUMMARY OF THE INVENTION

In one embodiment, the present invention includes a method for reducing reservoir simulator model run time, which comprises: i) selecting each decision variable for a reservoir simulator model; ii) calculating an operational base case for the reservoir simulator model using a computer processor, the operational base case representing production rates or injection rates over a predetermined time period for each decision variable; iii) selecting each time step for the reservoir simulator model; iv) determining values for a distribution at each time step for each decision variable using the operational base case production rates or injection rates; v) selecting a minimum number of cases to generate for the reservoir simulator model, each case representing reservoir simulator model input data; and vi) calculating input data for the reservoir simulator model that is used to construct a proxy model and reduces the run time for the reservoir simulator model on the computer processor.

In another embodiment, the present invention includes a non-transitory program carrier device tangibly carrying computer executable instructions for reducing reservoir simulator model run time. The instructions are executable to implement: i) selecting each decision variable for a reservoir simulator model; ii) calculating an operational base case for the reservoir simulator model using a computer processor, the operational base case representing production rates or injection rates over a predetermined time period for each decision variable; iii) selecting each time step for the reservoir simulator model; iv) determining values for a distribution at each time step for each decision variable using the operational base case production rates or injection rates; v) selecting a minimum number of cases to generate for the reservoir simulator model, each case representing reservoir simulator model input data; and vi) calculating input data for the reservoir simulator model that is used to construct a proxy model and reduces the run time for the reservoir simulator model.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like referenced numerals, and in which.

DETAILED DESCRIPTION OF THE PREFERRED EMBODIMENTS

Figure 1:
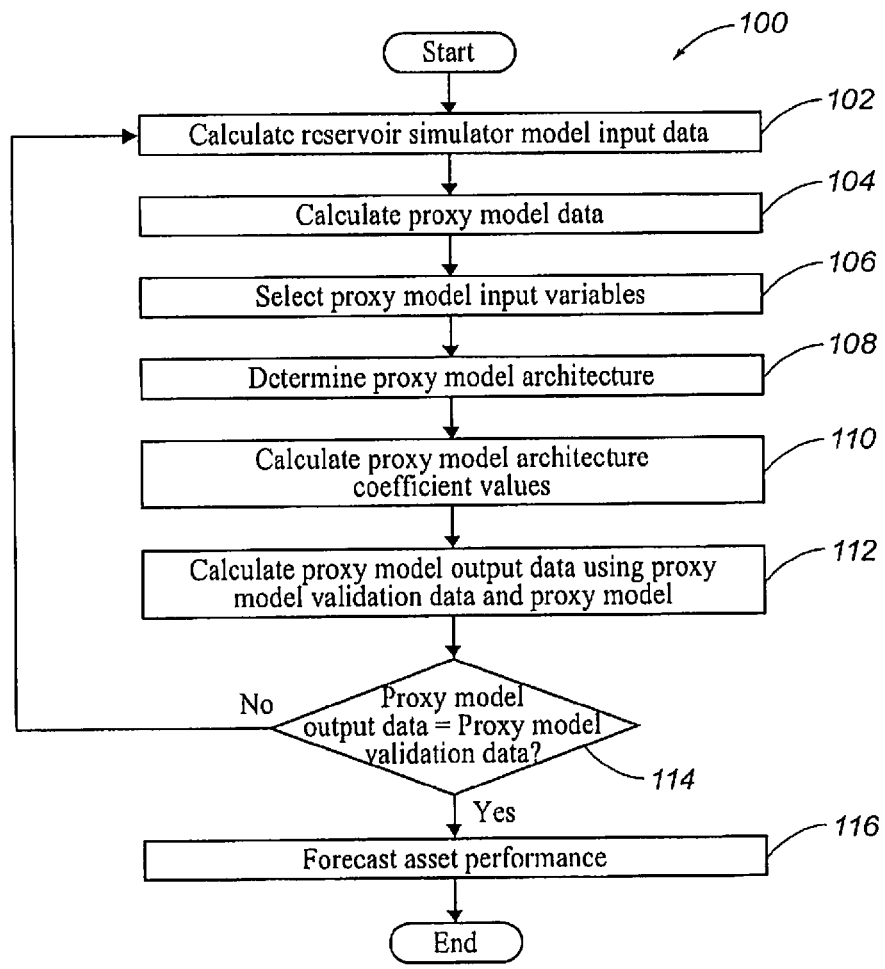
FIG. 1 is a flow diagram illustrating one embodiment of a method for implementing the present invention.

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied to other industries to achieve similar results.

Method Description

The present invention addresses the use of neural networks to generate or build a proxy model to reduce the run time for a reservoir simulator model. It is difficult to use a reservoir simulator model in fast cycle decision support since these models take a long time to execute. Fluid flow equations, which are the basis of any reservoir simulator model, operate on a homogeneous medium, but the physical structures represented by the reservoir simulator model are inherently heterogeneous. In order to overcome this limitation, the entire reservoir is broken down into individual homogeneous cells (or blocks), which approximate the heterogeneity of the real reservoir. Fluid flow in the reservoir is basically triggered by pressure differences between simulation cells, between a simulation cell and a producer well, or between a simulation cell and an injector well. The fluid flow between each pair of communicating elements (cells, producer wells, and injector wells) is governed by a set of equations that need to be solved in an iterative fashion until the numerical system converges to an answer. Since practical reservoir simulator models are comprised of many (sometimes millions) of cells, the total simulation time tends to be quite large even on very powerful computer systems. A proxy model is an empirical copy of a particular reservoir simulator model, which is accurate to only a particular limited set of operational regions. The proxy model can execute from four to even hundreds of times faster than the reservoir simulator model. Therefore, the proxy model can be used for fast-cycle decision support. In order to construct the empirical proxy model, data must be generated from the reservoir simulator model. That is done by executing the reservoir simulator model for a number of input cases to produce the production rate output from the reservoir simulator model. So it might seem that if execution time is an issue for a reservoir simulator model and the same reservoir simulator model must be executed multiple times to calculate the data needed to build a proxy model, then there may be no net benefit. However, if generating a proxy model can be automated and the number of case runs necessary to accurately generate the proxy model can be minimized, then the benefits of generating a proxy model can be realized.

The proxy model is capable of predicting the gas, water and oil production rates or injection rates for the entire reservoir and also for individual wells given any set of predefined well production and injection targets. The proxy model is based on the operational challenge of responding to different constraints for the decision variables (e.g. when to open, close or restrict flow from production and injection wells) in the time frame of the evaluation. The proxy model therefore, addresses how to constrain the operational parameters for various decision variables in order to reduce the run time of the reservoir simulator model (i.e. without having to run a full field numerical situation) while maintaining a reasonable representation of the reservoir simulator model.

Referring now to FIG. 1, a flow diagram illustrates one embodiment of a method 100 for implementing the present invention.

In step 102, the reservoir simulator model input data is calculated. The reservoir simulator model input data is represented by multiple cases wherein each case represents a value for all decision variables (e.g. well chokes, etc. that may be manipulated during the asset management decision support workflow) at every time step. The collection of cases therefore, represents the full operational range of interest for which the proxy model will be used. In this manner, the number of cases necessary to cover the full operational range of the reservoir simulator model can be reduced while still maintaining a reasonably accurate representation of the reservoir simulator model.

Figure 2:
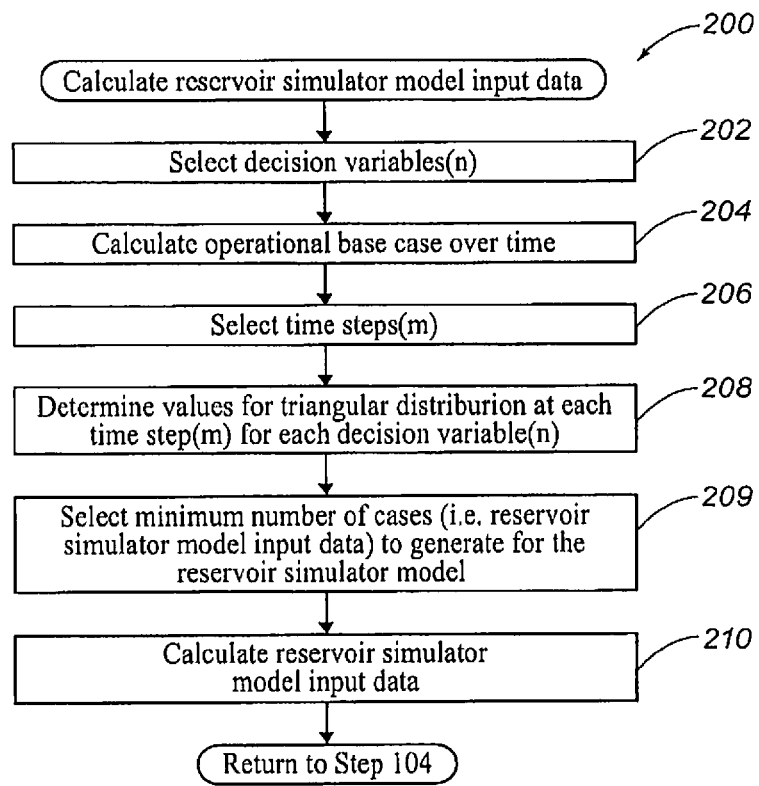
FIG. 2 is a flow diagram illustrating one embodiment of an algorithm for performing step 102 in FIG. 1.

Referring now to FIG. 2, a flow diagram illustrates one embodiment of a method 200 for implementing step 102 in FIG. 1.

Figure 3:
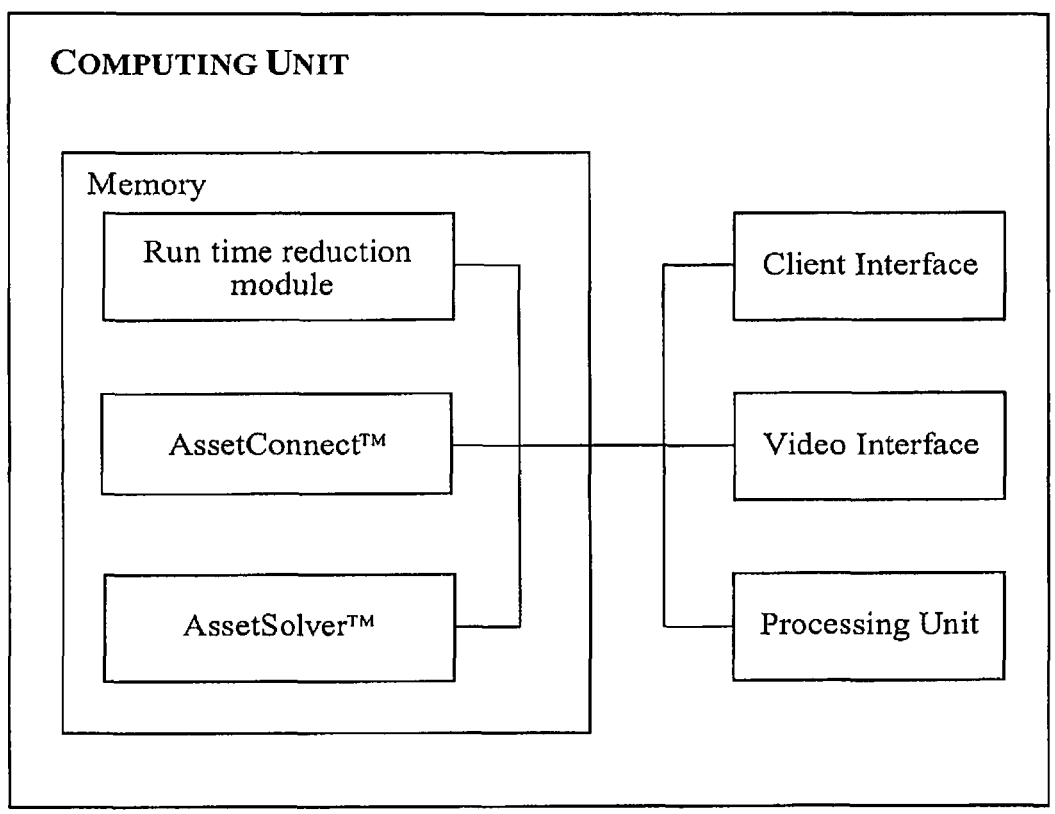
FIG. 3 is a block diagram illustrating one embodiment of a system for implementing the present invention.

In step 202, the total number of decision variables (n) for the reservoir simulator model are selected using the client interface/video interface described in reference to FIG. 3. The decision variables may represent chokes, surfaces pressures, gas lift and the like, which may be manipulated during the asset management decision support workflow.

In step 204, an operational base case for the reservoir simulator model is calculated over time by running the reservoir simulator model with the current best operational scenario inputs (e.g. choke settings, timing, etc.). The operational base case therefore, represents production rates or injection rates over a predetermined time period—meaning every time step—for each decision variable.

In step 206, the total number of time steps (m) for the reservoir simulator model are selected using the client interface/video interface described in reference to FIG. 3. Thus, the number of time steps and the time for each time step are selected and may be based on, for example, the base case production rates or injection rates from step 204. For example, the production rate for each well can be plotted using the base case production rates or injection rates from step 204. The plot will show a spike in the early time and then a long decay over the life of the well. Signal processing theory teaches that between 5 and 12 equally spaced points are needed to describe a decline curve. Thus, points representing each time step might be selected beginning at the start of the decline and extending to where the production rate flattens in equal increments. Most commonly, operators do not like to move well chokes more than once per month. Alternatively, selection of each time step can be based upon heuristic rules like how often operating scenarios will allow movements of the well chokes or by more complex methods well known in the art. Each time step may be represented by hours, days, months, or years, for example.

In step 208, values for a distribution are determined at each of the total number of time steps (m) for each of the total number of decision variables (n). One form of distribution that may be used is referred to as triangular distribution and typically requires three values: a minimum value and a maximum value, which may be selected using the client interface/video interface described in reference to FIG. 3, and a most likely value that may be similarly selected or calculated. Each value represents the status of a decision variable at a given time step (t). A minimum choke value, for example, may be set to a value representing a completely closed position for the choke at time step (t) and the maximum choke value may be set to a value representing a wide open position for the choke at time step (t). The most likely value at time step (t) may be selected from the production rates or injection rates in step 204 if each selected time step is identical to each respective time step for the predetermined time period. Alternatively, the most likely value may be calculated in such a way that when the choke movements are shifted from the base case to occur on the time steps selected in step 206, an identical cumulative production rate is calculated by both cases. This alternative ensures that the cumulative production rate from the base case and the one generated at the time steps selected in step 206 are identical. Another alternative might shift the base case well choke movement to a time step that is earlier than the one from the base case and move the choke back at the next time step to again ensure identical cumulative production rates or injection rates. Other forms of distribution, however, may be used for the same purposes, which are well known in the art.

In step 209, the minimum number of cases (i.e. reservoir simulator model input data) to generate for the reservoir simulator model is selected using the client interface/video interface described in reference to FIG. 3. The minimum number of cases must still be ten to one hundred times the number of decision variables selected in step 202. Typically, the minimum number of cases will be based on the minimum number of cases required to start the process, which may need to be increased depending on the results from step 114.

In step 210, the reservoir simulator model input data is calculated using a well known stochastic simulation algorithm such as, for example, Monte Carlo, Orthogonal Array and Latin Hypercube, and the results from steps 206 and 208. These algorithms are generally "exhaustive" search methods that normally require many thousands of cases of input data for the reservoir simulator model. The results from steps 206 and 208 are therefore, used to constrain the reservoir simulator model input data by limiting the number of cases to be equal to or greater than the minimum number of cases selected, with only the number of time steps selected in step 206, and which have values for the distribution calculated in step 208. The constrained number of cases generally represents 15-20% of the total number of cases that would otherwise be required using an unconstrained stochastic simulation algorithm. The reservoir simulator model input data is represented by (n×m) values for (x) number of cases.

In step 104, proxy model data are calculated using the reservoir simulator model input data from step 102 and the reservoir simulator model. In other words, the reservoir simulator model algorithm processes only the constrained runs determined by step 210 in a batch mode to calculate the proxy model data. The proxy model data comprises data that may be used for training (training data), testing (testing data) and validation (validation data). The proxy model data may be separated and marked as training data, testing data and validation data as it is calculated or, alternatively, after it is calculated. In addition, the proxy model data may be separated and marked by any predetermined criteria or randomly.

In step 106, total number of proxy model input variables are selected equal to the total number of decision variables for each time step using the client interface/video interface described in reference to FIG. 3.

In step 108, the proxy model architecture is determined using a neural network and the proxy model input variables selected from step 106. The neural network is a parallel mathematical structure composed of nodes, which calculate an individual result to be passed on to the other nodes for further processing. The proxy model architecture therefore, represents the total number of required nodes, which is determined using techniques well known in the art and the total number of proxy model input variables from step 106. Each nodes requires a value as a coefficient, which is determined by a training activity.

In step 110, the proxy model architecture coefficient values are calculated for each node in the proxy model architecture using techniques well known in the art such as, for example, back propagation or an optimization solver subroutine. The data used for each coefficient (node) is the training data and the testing data from step 104. After all coefficient values have been calculated, the neural network is referred to as being trained and represents a proxy model. The coefficient values are also often referred to as weights and biases.

In step 112, proxy model output data is calculated using the proxy model validation data from step 102 and the proxy model from step 110.

In step 114, the method 100 compares the proxy model output data from step 112 and the proxy model validation data from step 104 to determine if they are equal. If the proxy model output data equals the proxy model validation data, then the method 100 proceeds to step 116. If the proxy model output data does not equal the proxy model validation data, then the method 100 returns to step 102 to recalculate the reservoir simulator model input data using a larger minimum number of cases. In this manner, steps 102-114 are repeated until the proxy model output data is equal to the proxy model validation data.

In step 116, asset performance is forecasted using the trained and validated proxy model. In order to forecast asset performance, the proxy model may be used in a fast-cycle decision process such as, for example, daily forecasting and daily optimization. In the daily forecasting workflow, the current operational settings are run through the proxy model to predict the asset production for a predefined number of years. The operation's team can then determine what needs to be done to modify the status quo using the proxy model in a trial and error manner. In the optimization workflow, the desired end state of the asset is set by a user and iteratively uses the proxy model to determine where to set the asset decision variables (e.g. chokes) to achieve a predefined objective.

The method 100 has been proven to generate accurate proxy models in 15%-20% of the time that standard exhaustive stochastic simulation algorithms would take. The resulting proxy models have also demonstrated accuracy to within 2.5% (see tables 1-3) of conventional reservoir simulator models and can execute the full model in one-quarter of the time that it takes the conventional reservoir simulator model to execute the full model.

TABLE 1

Scenarios for a 9500 days-forecasting

| Case | Well # | Event | Constraint $m^3/d$ | Base case $m^3/d$ | Start date | End date | days |
| --- | --- | --- | --- | --- | --- | --- | --- |
| D01 | 1 | Production well: shut down for 03 months | 0 | 1710 | Aug. 1, 2009 | Oct. 30, 2009 | 90 |
| D02 | 2 | Injection well: water flow rate reduction | 1000 | 2000 | Jul. 2, 2010 | May 22, 2011 | 324 |

TABLE 2

Average NN model and Numerical simulation deviation for some parameters for Case D01

| Parameter | NN - Numerical simulation deviation (%) |
| --- | --- |
| FOPR | 1.442 |
| FOPT | 0.446 |
| FGPR | 1.367 |
| FGPT | 0.463 |
| FWPR | 2.387 |
| FWPT | 2.409 |
| FWIR | 1.278 |

TABLE 2-continued

Average NN model and Numerical simulation deviation
for some parameters for Case D01

| Parameter | NN - Numerical simulation deviation (%) |
|---|---|
| FWIT | 0.952 |
| RPR_1 | 1.882 |

TABLE 3

Average NN model and Numerical simulation deviation
for some parameters for Case D02

| Parameter | NN - Numerical simulation deviation (%) |
|---|---|
| FOPR | 1.390 |
| FOPT | 0.337 |
| FGPR | 1.361 |
| FGPT | 0.394 |
| FWPR | 2.199 |
| FWPT | 1.991 |
| FWIR | 1.282 |
| FWIT | 0.917 |
| RPR_1 | 1.822 |

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. AssetConnect™ and AssetSolve™, which are commercial software applications marketed by Landmark Graphics Corporation, may be used to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 3, a block diagram illustrates one embodiment of a system for implementing the present invention on a computer. The system includes a computing unit, sometimes referred to a computing system, which contains memory, application programs, a client interface, a video interface and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-2. The memory therefore, includes a run time reduction module, which enables the methods illustrated and described in reference to FIGS. 1-2 and integrates functionality from the remaining application programs illustrated in FIG. 3. The run time reduction module, for example, may be used to execute many of the functions described in reference to step 102 in FIG. 1. AssetConnect™ may be used, for example, to execute the functions described in reference to steps 104 and 116 in FIG. 1. And, AssetSolver™, may be used, for example, to execute the functions described in reference to steps 108, 110, 112 and 116 in FIG. 1.

Although the computing unit is shown as having a generalized memory, the computing unit typically includes a variety of computer readable media. By way of example, and not limitation, computer readable media may comprise computer storage media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/non-removable, volatile/non-volatile computer storage media or they may be implemented in the computing unit through application program interface ("API"), which may reside on a separate computing unit connected through a computer system or network. For example only, a hard disk drive may read from or write to non-removable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method comprising:
   determining, by a processor, a plurality of decision variables for a reservoir simulator model configured to simulate a reservoir, wherein each decision variable among the plurality of decision variables is a manipulatable parameter that effects how the reservoir simulator model simulates the reservoir;
   determining, by the processor, a base case by executing the reservoir simulator model using a set of predefined values for the plurality of decision variables as input, the base case representing production rates or injection rates over a predetermined time period;
   determining, by the processor, a total number of time steps based on the production or injection rates from the base case;
   determining, by the processor, a plurality of triangular distributions by, for each time step over the total number of time steps:
      calculating a respective triangular distribution for each respective decision variable among the plurality of decision variables, wherein the respective triangular distribution includes (i) a minimum value for the respective decision variable, (ii) a maximum value for the respective decision variable, and (iii) a most likely value for the respective decision variable;
   generating, by the processor, reservoir simulator model input data by executing a stochastic simulation algorithm that is constrained by (i) a predetermined minimum number of cases, (ii) the total number of time steps, and (iii) the plurality of triangular distributions;
   executing, by the processor, the reservoir simulator model using the reservoir simulator model input data as input to produce corresponding output data as output from the reservoir simulator model;
   generating, by the processor, training data that includes relationships between the reservoir simulator model input data and the corresponding output data from the reservoir simulator model;
   creating, by the processor, a neural network that is separate from the reservoir simulator model;
   training, by the processor, the neural network using the relationships expressed in the training data to enable the neural network to serve as a proxy model for the reservoir simulator model, wherein the neural network is more quickly executable than the reservoir simulator model; and
   executing, by the processor, the proxy model to generate a forecast indicating a characteristic of the reservoir at a future point in time.

2. The method of claim 1, wherein the minimum value is selected and represents a value for a choke in a completely closed position at a respective time step.

3. The method of claim 1, wherein the maximum value is selected and represents a value for a choke in a wide open position at a respective time step.

4. The method of claim 1, wherein the most likely value is selected based on each time step in the total number of time steps being identical to each time step in the predetermined time period.

5. The method of claim 1, wherein the most likely value is calculated using the production rates or injection rates from the base case.

6. The method of claim 1, wherein the predetermined minimum number of cases is at least ten times the number of decision variables in the plurality of decision variables.

7. The method of claim 1, wherein the stochastic simulation algorithm includes a Monte Carlo algorithm, an orthogonal array algorithm, or a Latin hypercube algorithm.

8. The method of claim 1, further comprising creating the neural network at least in part by determining a total number of nodes for the neural network based on a total number of proxy model input variables.

9. The method of claim 1, further comprising adjusting a setting associated with an asset-production tool based on the forecast.

10. A non-transitory program carrier device tangibly carrying instructions executable by a processor for causing the processor to perform operations including:
   determining a plurality of decision variables for a reservoir simulator model configured to simulate a reservoir, wherein each decision variable among the plurality of decision variables is a manipulatable parameter that effects how the reservoir simulator model simulates the reservoir;
   determining a base case by executing the reservoir simulator model using a set of predefined values for the plurality of decision variables as input, the base case representing production rates or injection rates over a predetermined time period;
   determining a total number of time steps based on the production or injection rates from the base case;
   determining a plurality of triangular distributions by, for each time step over the total number of time steps:
      calculating a respective triangular distribution for each respective decision variable among the plurality of decision variables, wherein the respective triangular distribution includes (i) a minimum value for the respective decision variable, (ii) a maximum value for the respective decision variable, and (iii) a most likely value for the respective decision variable;

generating reservoir simulator model input data by executing a stochastic simulation algorithm that is constrained by (i) a predetermined minimum number of cases, (ii) the total number of time steps, and (iii) the plurality of triangular distributions;

executing the reservoir simulator model using the reservoir simulator model input data as input to produce corresponding output data as output from the reservoir simulator model;

generating training data that includes relationships between the reservoir simulator model input data and the corresponding output data from the reservoir simulator model;

creating a neural network that is separate from the reservoir simulator model;

training the neural network using the relationships expressed in the training data to enable the neural network to serve as a proxy model for the reservoir simulator model, wherein the neural network is more quickly executable than the reservoir simulator model; and executing the proxy model to generate a forecast indicating a characteristic of the reservoir at a future point in time.

11. The non-transitory program carrier device of claim 10, wherein the minimum value is selected and represents a value for a choke in a completely closed position at a respective time step.

12. The non-transitory program carrier device of claim 10, wherein the maximum value is selected and represents a value for a choke in a wide open position at a respective time step.

13. The non-transitory program carrier device of claim 10, wherein the most likely value is selected based on each time step in the total number of time steps being identical to each time step in the predetermined time period.

14. The non-transitory program carrier device of claim 10, wherein the most likely value is calculated using the production rates or injection rates from the base case.

15. The non-transitory program carrier device of claim 10, wherein the predetermined minimum number of cases is at least ten times the number of decision variables in the plurality of decision variables.

16. The non-transitory program carrier device of claim 10, further comprising instructions executable by the processor to create the neural network at least in part by determining a total number of nodes for the neural network based on a total number of proxy model input variables.

17. The non-transitory program carrier device of claim 10, further comprising instructions executable by the processor to adjust a setting associated with an asset-production tool based on the forecast.

* * * * *